United States Patent
Cruz

(10) Patent No.: US 9,728,972 B2
(45) Date of Patent: Aug. 8, 2017

(54) ALTERNATIVE ENERGY BUS BAR BY PASS BREAKER, METHODS OF USE AND INSTALLATION

(71) Applicant: Q Factory 33 LLC, Encinitas, CA (US)

(72) Inventor: Paul Cruz, San Diego, CA (US)

(73) Assignee: QFE 002 LLC, Encinitas, CA (US)

( * ) Notice: Subject to any disclaimer, the term of this patent is extended or adjusted under 35 U.S.C. 154(b) by 139 days.

(21) Appl. No.: 14/464,578

(22) Filed: Aug. 20, 2014

(65) Prior Publication Data

US 2016/0056617 A1 Feb. 25, 2016

(51) Int. Cl.
  *H02J 3/38* (2006.01)
  *H02B 3/00* (2006.01)
  *H02J 3/00* (2006.01)
  *H01H 71/02* (2006.01)
  (Continued)

(52) U.S. Cl.
  CPC ........... *H02J 3/382* (2013.01); *H02B 3/00* (2013.01); *H02J 3/006* (2013.01); *H01H 71/02* (2013.01); *H01H 71/08* (2013.01); *H01H 73/06* (2013.01); *Y02B 10/30* (2013.01); *Y02E 10/763* (2013.01); *Y04S 10/525* (2013.01)

(58) Field of Classification Search
  None
  See application file for complete search history.

(56) References Cited

U.S. PATENT DOCUMENTS 4,100,587 A 7/1978 Anderson
4,288,768 A 9/1981 Arnhold
5,206,777 A 4/1993 Clarey
(Continued)

FOREIGN PATENT DOCUMENTS

WO WO 2012035442 3/2012
WO WO 2012/172616 12/2012
WO WO 2013177623 12/2013

OTHER PUBLICATIONS

J. Wiles, "Making the Utility Connection", Sep.-Oct. 2005, IAEI, IAEI Sep.-Oct. 2005, retrieved from <http://iaeimagazine.org/magazine/2005/09/16/making-the-utility-connection/> on Oct. 27, 2016.*

(Continued)

*Primary Examiner* — Rexford Barnie
*Assistant Examiner* — David Shiao
(74) *Attorney, Agent, or Firm* — Knobbe Martens Olson & Bear LLP

(57) ABSTRACT

The present invention is directed, in part, to electrical components and methods of use associated with such components. In particular, the invention relates to an electrical device and improved method of back feeding energy generated from alternative energy devices such as solar panels, wind turbines, fuel cells, electrical generators and other alternative energy sources, to the utility without the necessity of installing a sub panel or replacing an existing panel, resulting in significant cost savings for the user and increased electrical energy available to the power grid. The invention further discloses installation of a back feed circuit breaker into an existing main panel and main circuit breaker thus, eliminating the need of a home owner to completely reinstall a new electrical system in order to install alternative energy sources such as for example, solar panels and the like.

19 Claims, 11 Drawing Sheets

(51) Int. Cl.
*H01H 71/08* (2006.01)
*H01H 73/06* (2006.01)

(56) References Cited

U.S. PATENT DOCUMENTS

| | | | |
|---|---|---|---|
| 5,349,144 A | 9/1994 | Baragar | |
| 5,638,296 A | 6/1997 | Johnson | |
| 6,671,634 B2* | 12/2003 | Koutlev | G05B 17/02 |
| | | | 324/537 |
| 6,750,391 B2 | 6/2004 | Bower | |
| 6,849,967 B2* | 2/2005 | Lathrop | H02J 9/08 |
| | | | 307/64 |
| 6,985,784 B2 | 1/2006 | Vandevanter | |
| 6,992,872 B2 | 1/2006 | Morris | |
| 7,648,389 B1* | 1/2010 | Scott | H01R 9/2491 |
| | | | 439/517 |
| 7,704,083 B1 | 4/2010 | Cheyne | |
| 7,710,697 B2 | 5/2010 | Michalko | |
| 7,824,191 B1 | 11/2010 | Browder | |
| 7,855,871 B2 | 12/2010 | Hudgins, Jr. | |
| 7,919,953 B2 | 4/2011 | Porter | |
| 7,929,327 B2* | 4/2011 | Haines | H02J 9/062 |
| | | | 363/106 |
| 7,977,818 B1 | 7/2011 | Wahl | |
| 7,991,567 B1 | 8/2011 | Mulick | |
| 8,267,562 B2 | 9/2012 | Biedrzycki | |
| 8,350,417 B1 | 1/2013 | Dooley et al. | |
| 8,395,919 B2 | 3/2013 | Schroeder | |
| 8,446,040 B2 | 5/2013 | Paik | |
| 8,547,672 B2 | 10/2013 | Benton | |
| 8,598,445 B2 | 12/2013 | Schroeder | |
| 8,700,224 B2 | 4/2014 | Mathiowetz | |
| 8,742,620 B1 | 6/2014 | Brennan | |
| 8,784,130 B2 | 7/2014 | Scott | |
| 2005/0207097 A1 | 9/2005 | Neace | |
| 2009/0027932 A1 | 1/2009 | Haines et al. | |
| 2009/0206059 A1 | 8/2009 | Kiko | |
| 2010/0165519 A1 | 7/2010 | Henson | |
| 2012/0026769 A1 | 2/2012 | Schroeder | |
| 2012/0193987 A1* | 8/2012 | Siglock | H02J 3/386 |
| | | | 307/64 |
| 2012/0223675 A1* | 9/2012 | Bianco | B60L 11/1844 |
| | | | 320/109 |
| 2012/0281444 A1* | 11/2012 | Dent | H02M 1/32 |
| | | | 363/56.01 |
| 2012/0300348 A1 | 11/2012 | Franks | |
| 2012/0318351 A1 | 12/2012 | Pfennig | |
| 2012/0326518 A1 | 12/2012 | Rusch | |
| 2013/0049464 A1* | 2/2013 | Fumamoto | H01M 10/44 |
| | | | 307/24 |
| 2013/0200714 A1* | 8/2013 | Pan | H02J 3/386 |
| | | | 307/82 |
| 2013/0214593 A1 | 8/2013 | Ohashi | |
| 2013/0269181 A1 | 10/2013 | McBride | |
| 2014/0062202 A1* | 3/2014 | Yamada | H02J 3/32 |
| | | | 307/66 |
| 2014/0099820 A1 | 4/2014 | Robinson | |
| 2014/0127935 A1 | 5/2014 | Scott | |
| 2014/0252855 A1* | 9/2014 | Watanabe | H02J 3/00 |
| | | | 307/31 |
| 2014/0253014 A1* | 9/2014 | Nishikawa | H02J 7/35 |
| | | | 320/101 |
| 2014/0339900 A1* | 11/2014 | Shinomoto | H02H 3/066 |
| | | | 307/66 |
| 2015/0248987 A1* | 9/2015 | Lu | H01H 71/08 |
| | | | 200/293 |
| 2015/0318700 A1* | 11/2015 | Inakagata | H02J 3/32 |
| | | | 307/20 |
| 2015/0333491 A1 | 11/2015 | Cruz | |
| 2016/0141846 A1 | 5/2016 | Atchley | |

OTHER PUBLICATIONS

"Photovoltaic Tutorial: Step-by-Step Guide to Going Solar", as retrieved by wayback machine on Mar. 9, 2014, TheSolarPlanner.com, retrieved from <http://web.archive.org/web/20140309165209/http:/www.thesolarplanner.com/steps_page8.html> on Oct. 27, 2016.*
Terri Steele, "The Unsung Hero of Solar Power International," Nov. 1, 2014: http://theecoreport.com/the-unsung-hero-of-solar-power-international/.
International Search Report and Written Opinion issued in PCT/US2014/38492 dated Sep. 22, 2014.
International Search Report and Written Opinion issued in PCT/2014/0053448 dated Dec. 18, 2014.
M.Kempkes, I. Roth, M. Gaudreau, "Solid-State Circuit Breakers for Medium Voltage DC Power", IEEE Electric Ship Technologies Symposium, pp. 254-257, Apr. 2011.
International Preliminary Report on Patentability issued in PCT/US14/53448 dated Jul. 14, 2016.
"Energizing Grid Connected Solar PV Systems" Essential Energy, Issue 3, Apr. 2011, pp. 1-14.
Kumm, Marty, Significant Code Changes in 2014 NEC Articles 690 and 705 affecting the installation of Solar Photovoltaic (PV) Systems, 2014, pp. 1-5.
McCalmont, Scott, Residential Supply-Side Interconnection, SolarPro Magazine, Issue 3.5, Aug./Sep. 2010, pp. 1-3.
Wiles, John, Connecting Inverters to the Grid, Home Power 134, Dec. 2009, pp. 106-108.
Wiles, John, Making the Utility Connection, Home Power 111, Feb. 2006, pp. 94-96.
Wiles, John, Photovoltaic Power Systems and the National Electrical Code, Mar. 2001, pp. 1-117.

* cited by examiner

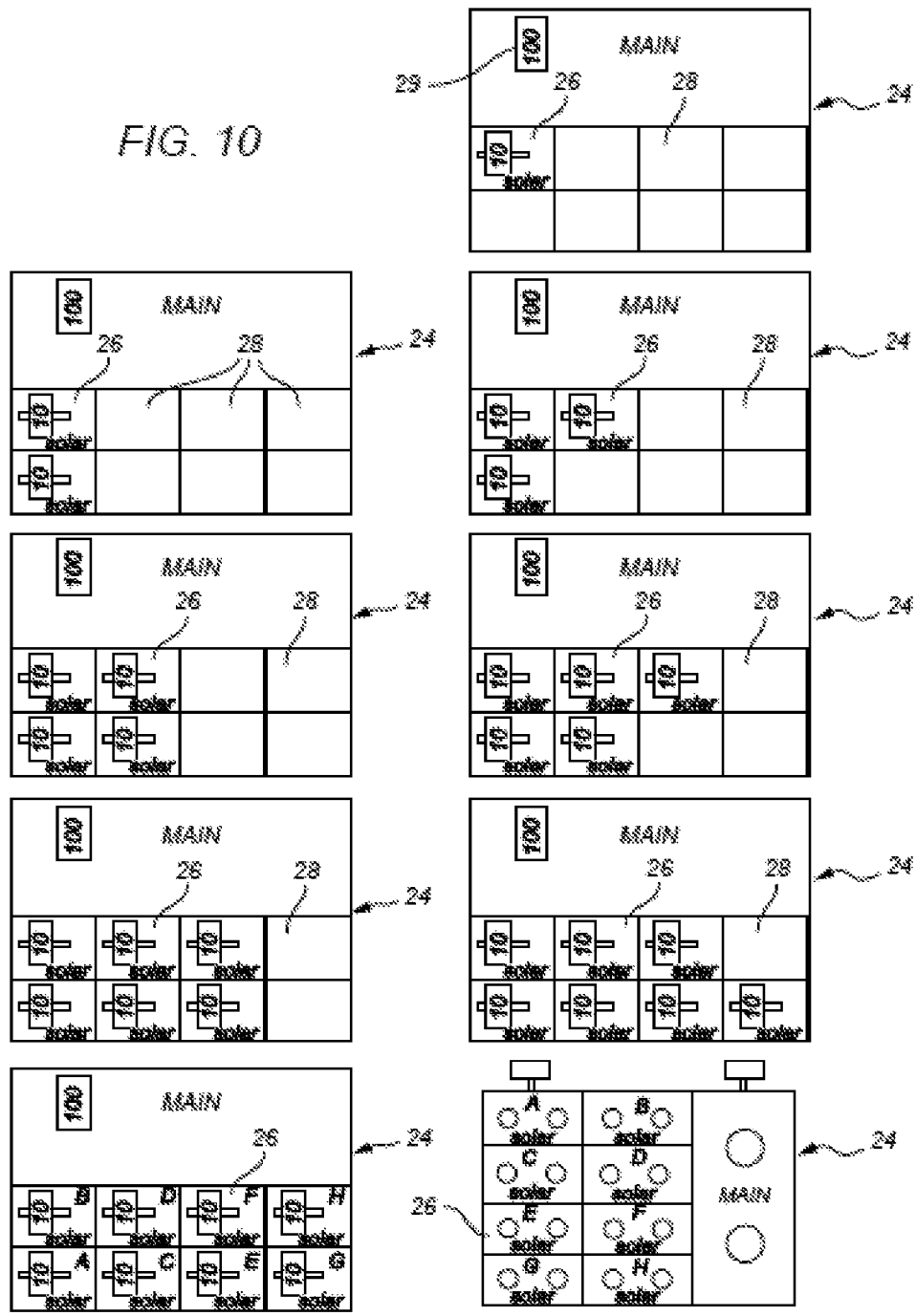

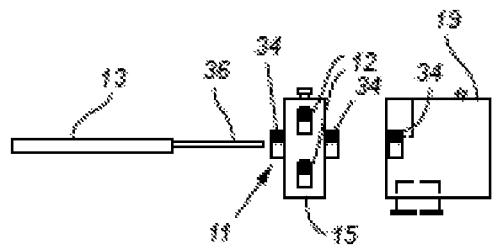
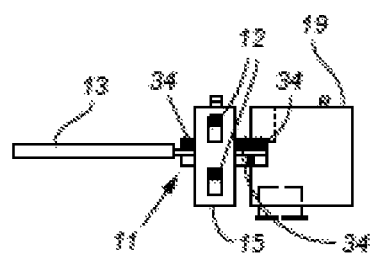
FIG. 19A          FIG. 19B
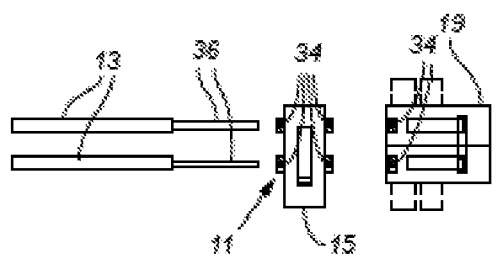
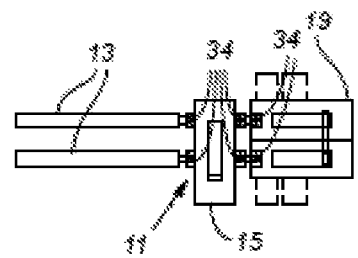
FIG. 20A          FIG. 20B
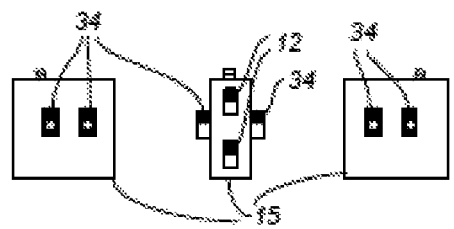
FIG. 21

ALTERNATIVE ENERGY BUS BAR BY PASS BREAKER, METHODS OF USE AND INSTALLATION

FIELD OF THE INVENTION

This application claims the benefit of U.S. application Ser. No. 14/276,217, filed May 14, 2014, and International application PCT/US2014/038492, filed May 16, 2014, the substance of which is incorporated herein in its entirety. The present invention relates generally to electrical components and methods of use associated with such components. In particular, the invention relates to an electrical device and improved method of back feeding energy generated from alternative energy devices such as solar panels, wind turbines, fuel cells, electrical generators and other alternative energy sources, to the utility without the necessity of installing a sub panel or replacing an existing main panel, resulting in significant cost savings for the user and increased electrical energy availability to the power grid.

BACKGROUND OF THE INVENTION

Traditionally, the circuit breaker is designed to be the weak link in a home or commercial electrical system and designed to fail safely. In the event a circuit draws more current than it is designed to handle, the corresponding wiring gets hot and problems can occur including fires. The use of so-called "overcurrent" safety devices such as the circuit breaker are designed to prevent such fires by breaking the circuit and stopping the occurrence of heat build due to a greater than expected level of electrical current. Circuit breakers connect to the hot bus bars and come in a variety of types and capacities.

Single Pole Breakers provide 120 volts and typically come in ratings of 15 to 20 amps. These breakers make up the majority of breakers in a standard home. Double Pole Breakers provide 240 volts and typically come in ratings from 15 to 50 amps. These breakers generally serve dedicated circuits for large appliances such as electric dryers, stoves and air conditioners.

The service main panel is typically configured with two bus bars ($L_1$, $L_2$ and a ground neutral bar) typically comprised of a thick strip of copper or aluminum that conducts electricity within a distribution board, switchboard, substation or any other electrical apparatus. Bus bars are typically used to carry or dispense very large currents to several devices that are inside the switchgear such as to home appliances or other electricity consuming apparatus.

Modernly, remodeling and installation of alternative energy devices including solar panels, wind turbines or other power generating equipment in a home or commercial building have required either replacing the structure's electrical main panel or installation of a sub panel in order to accommodate the extra load generated by the additional alternative energy devices being installed. Replacement of a new service panel and/or installation of new sub panels to an existing electrical system results in significant expenses to the home or building owner committing the owner to an investment of several years of alternative energy generation to recoup the expense associated with installation of the alternative energy device.

National Electrical Code (NEC) sections 690.64(B)/705.12(D) govern the requirements and limitations of bus bar load. Bus bars are generally intended to deliver electrical power from the main panel to the various circuit breakers that are employed in distribution of power to a residential or commercial dwelling. 705.12(D)(2) provides in part: Buss or Conductor Rating: The Sum of the ampere ratings of over-current devices in circuits supplying power to a bus bar or conductor shall not exceed 120 percent of the rating of the bus bar or conductor.

From a practical perspective, regulations that govern electrical power through a bus bar preclude the transfer of such power beyond 120% of the amperage rating of the bus bar. Accordingly, to maintain compliance with regulations, the installation of alternative energy sources to a home or commercial building including solar power, wind turbines and the like, require a complete replacement of the existing main panel, or addition of a sub panel to accommodate excess power back fed to the utility since excess power can potentially overload the amperage rating of the bus bars leading to the risk of fire.

Various devices have sought to address issues in detecting and preventing instances of overcurrent as well as in managing back fed power generated from alternative energy sources to the power grid, however none have fully addressed shortcomings currently existing in the art. For example, U.S. Patent Application number 2012/0300348 describes a circuit breaker and trip logic that includes fault detection within each of a plurality of circuit breakers whereby the trip logic enables tripping options to be selected for each of the circuit breakers. The disclosure however, does not provide a solution relating to the matter of excess power management through bus bars of a specific amperage. More importantly, it fails to address avoiding the necessity of replacement an existing main panel which results in significant time and expense to a home owner or commercial building owner.

U.S. Pat. No. 4,288,78 to Arnhold et al., describes a circuit breaker for interrupting a current circuit in response to an overload current, or a short circuit current, or in response to an earth leakage or fault current. It further describes one or several single pole circuit breakers with an earth leakage current circuit breaker for such overcurrents. It however, does not disclose or suggest a provision for the management of overcurrent through bus bars generated from alternative energy sources such as for example, newly installed solar panels or wind turbine assemblies.

U.S. Pat. No. 4,100,587 describes a circuit configured between a power supply and a load for detecting the flow of excess power from a load back through the supply. The circuit is described as sensing the current flowing between the power supply and the load, and also senses the output voltage from the power supply with further embodiments that act to generate a signal to disconnect the power supply from the load when the average power signal is above a certain threshold. Again, the device and methods fail to address the issue of significant time and expense in installation of alternative energy sources and for avoiding the significant costs and time required in maintaining current within NEC specifications even during instances of overcurrent generated from such alternative energy sources.

Accordingly, difficulties in the field of electrical back feed to the power grid and cost savings associated with the installation of alternative energy sources remain. Existing solutions fail to address particular deficiencies that confront businesses and consumers seeking alternatives to the existing art and a solution to advancing cost and time saving measures for greater implementation of alternative energy options remains elusive. The present invention seeks to address these shortcomings.

SUMMARY OF THE INVENTION

The present invention is directed to a back feed circuit breaker that is tapped in parallel with power incoming from a power grid and utility. The parallel tap is disposed either between a main circuit breaker (breaker side) of the service panel and the bus bars of the main panel. Alternatively, the parallel tap is disposed between a power meter that is connected to a power utility grid (supply side) and the main circuit breaker, again, prior to the bus bars, which in turn lead to sub breakers that distribute power to a home, building or other structure. The back feed circuit breaker is connected to and manages the power generated from a source of alternative energy, including for example; solar panels, wind turbines, electrical generators or any other alternative energy sources as known in the art wherein the alternative energy source generates excess power that can be transferred back to the power grid and utility, or alternatively, to the structure during times of energy need.

The back feed circuit breaker of the invention is tapped in parallel to power incoming from the utility and configured to create a direct circuit between the back feed circuit breaker and the main panel while by-passing the bus bars of the main circuit breaker in order to back feed power to the utility. In this configuration, excess power generated from the alternative energy source does not pass through the bus bars of the main panel. As excess power is generated by the alternative energy source, a circuit formed by the parallel tap with the main circuit breaker, either configured supply side or breaker side, delivers the excess power to the utility, while the power bypasses the bus bars completely since the bus bars do not form any portion of the circuit.

During instances in which power is needed in the structure, a circuit is created between the back feed circuit breaker, the main circuit breaker and the bus bars which in turn lead to sub-breakers which feed and distribute power to the structure so to deliver power generated from the alternative energy source as needed. In so doing, compliance with NEC regulations relating to bus bar amperage rating is maintained.

The present invention further provides interchangeable sub breakers configured within the main circuit breaker of the invention to allow a user to increase the capacity of alternative energy generation and to install additional alternative energy power sources. In particular, the invention will be configured with a main circuit breaker that employs interchangeable sub breakers that allow for the expansion and upgrade of existing alternative energy sources in the home, building or structure.

Disposed between the main circuit breaker and the one or more bus bars of the main circuit breaker is a parallel tap stemming from a back feed circuit breaker that connects to one or more alternative energy sources including solar panels, wind turbines, gas powered generators or other power generating sources as known in the art. Forming part of the main circuit breaker are interchangeable sub breakers that allow a user to change the amperage allowance of the back feed sub breakers in order to add or improve the alternative energy capacity of a home or commercial building. Upgraded main sub breakers can be installed in order to install additional solar panels either during construction of the structure or years later when additional alternative energy and equipment is desired. The interchangeable main sub breakers allow a user to install upgraded solar panels, wind turbines or electricity generating gas generators into the structure without the need to install sub panels or to replace a service main panel in order to accommodate the upgraded alternative energy sources or the back feed circuit breaker.

The present invention further relates to a novel bus bar clamping mechanism wherein the "hot" and "neutral" lines of a main panel connect and are clamped directly to the bus bars of the main circuit breaker. The prior art generally employs a "spring to bus bar" mechanism wherein the spring terminal is pushed onto the terminal end of the bus bars in order to establish an electrical connection. It is likewise known that in such a configuration, over time, loss of conductance and carbon build up occurs which can result in an increased risk of fire. The present invention addresses that shortcoming by creating a direct and secure connection between the hot lines of a main panel circuit breaker and the bus bars thereby eliminating the carbon build up and corrosion between the terminal springs and bus bars. The present invention is also isolated so electrical shock is eliminated when tightening and clamping bus bars. As part of this embodiment, the invention also includes a heat sensor disposed in the main circuit breaker, which acts to detect instances in which load bearing lines of the main circuit is occurring. The heat sensor is disposed near the bus bar connection to the hot lines.

The present invention further relates to a back feed circuit breaker that manages excess power generated by an alternative energy source wherein power generated by the alternative energy source is tapped in parallel with the hot lines of the main circuit breaker coming from the utility wherein the parallel tap is disposed between the utility meter and the main circuit breaker (supply side). In such a configuration, excess power generated by the alternative energy source is transferred directly to the power grid. During times in which the home or building requires power, the parallel tap delivers power from the alternative energy source to the main panel, and thereafter through the bus bars and to sub breakers to distribute power to the structure.

The present invention further relates to a back feed circuit breaker that manages excess power generated by an alternative energy source wherein the power generated by the alternative energy source is tapped in parallel with the hot lines of the main circuit breaker and is disposed between the main circuit breaker and the bus bars (breaker side). In such a configuration, excess power is delivered directly to the power grid. Alternatively, in times of need, the parallel tap delivers power generated by the alternative energy source to the home or building by transferring the power to the bus bars and onward to sub breakers that distribute power.

BRIEF DESCRIPTION OF THE DRAWINGS

FIG. 10 illustrates the main circuit breaker and one or more interchangeable sub breakers of the invention. As shown, the figure illustrates one or more interchangeable sub circuit breakers that are connected to a main circuit breaker with the main and sub breakers depicted as 2-pole, 240-volt breakers. Also provided is a side view of the main circuit breaker and one or more interchangeable sub breakers with terminal connections provided.

FIG. 16A illustrates a main power source that is connected to the back feed circuit breaker of the invention which is in turn, is connected to the main circuit breaker. FIG. 16B illustrates the connection of the main power lines, the back feed circuit breaker and the main circuit breaker. As shown in 16B, the elements of the invention are fitted together to create an electrical circuit with fittings secured with a wire fastening device to securely connect the components together The Figures illustrate a side view perspective.

FIG. 17A illustrates a main power source that is connected to the back feed circuit breaker of the invention which in turn, is connected to the main circuit breaker. FIG. 17B illustrates the connection of the main power lines, the back feed circuit breaker and the main circuit breaker. As shown in 17B, the elements of the invention are fitted together to create an electrical circuit with fittings secured with a wire fastening device to securely connect the components together. The Figures illustrate a top view perspective.

FIGS. 19A and 19B illustrate an alternative embodiment relating to the basic installation of the back feed circuit breaker into an existing main circuit breaker. FIG. 19A illustrates a main power source line that is connected to the back feed circuit breaker of the invention, which in turn is connected to the main circuit breaker. FIG. 19B illustrates the connection of the main power line, the back feed circuit breaker and the main circuit breaker. As shown in 19B, the elements of the invention are fitted together to create an electrical circuit with fittings secured with a wire fastening device to securely connect the components together. The Figures illustrate a side view perspective.

FIGS. 20A and 20B illustrate an alternative embodiment relating to the basic installation of the back feed circuit breaker into an existing main panel and main circuit breaker.

FIG. 20A illustrates a main power source that is connected to the back feed circuit breaker of the invention which is in turn, is connected to the main circuit breaker. FIG. 20B illustrates the connection of the main power lines, the back feed circuit breaker and the main circuit breaker. As shown in 20B, the elements of the invention are fitted together to create an electrical circuit with fittings secured with a fastening device to securely connect the components together. The Figures illustrate a top view perspective.

FIG. 21 illustrates the physical attributes of the back feed circuit breaker and the connections related to the main power lines, the back feed circuit breaker and the main circuit breaker of an existing main panel. The connections depict a two-phase power source.

DETAILED DESCRIPTION OF THE INVENTION

Figure 1:
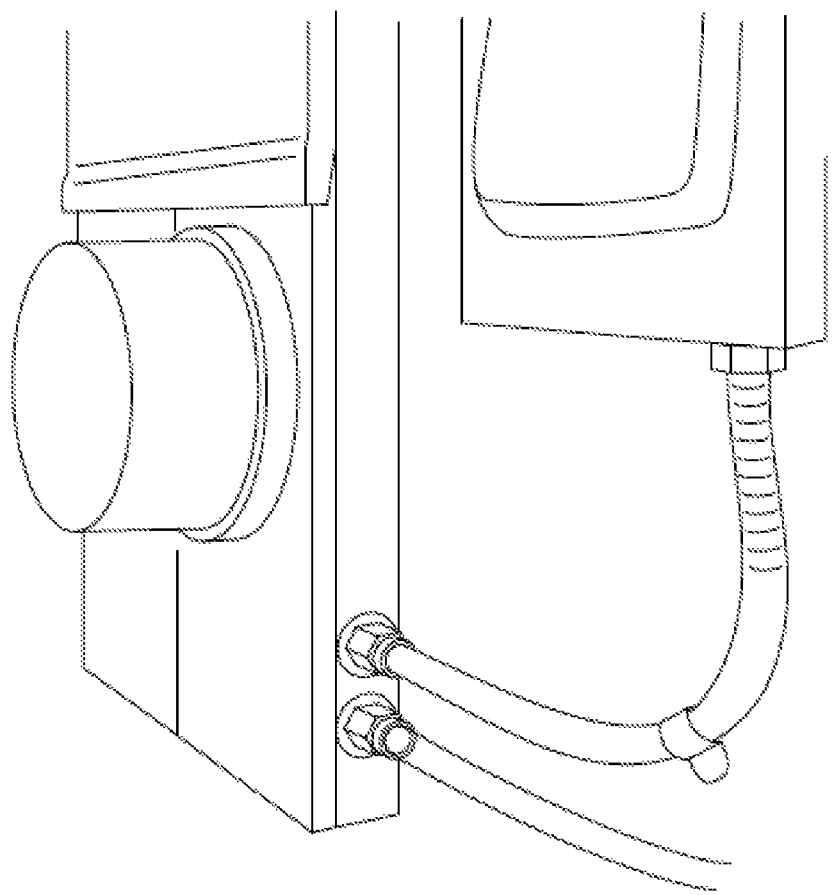
FIG. 1 depicts the pre-existing art wherein a sub panel is installed in order to accommodate the installation of an alternative energy source such as for example, solar panels.

The present invention is directed to a novel bus bar by pass circuit breaker and method of back feeding excess power to the power grid wherein power generated by an alternative energy device such as for example, solar panels, wind turbines and the like is transferred to a back feed circuit breaker that is tapped in parallel to the lines of a main circuit breaker while by-passing the bus bars of the circuit breaker. As part of the invention, the parallel tap is disposed between the main circuit breaker of a main service panel and the bus bars of the main service panel (breaker side) so power is never passed through the bus bars. In other words, power generated by the alternative energy source bypasses the bus bars and is delivered directly to the utility power grid.

Alternatively, the parallel tap is disposed between the power grid and the main circuit breaker of the invention (supply side). Again, the power generated by the alternative energy source never passes through the bus bars and is delivered directly to the power grid. The back feed circuit breaker is connected to and manages the power generated from a source of alternative energy including for example, solar panels, wind turbines, electrical generators or any other alternative energy sources as known in the art. The power generated by the alternative energy source is transferred to the power grid and utility by means of a parallel tap with the main circuit breaker with power by-passing the bus bars of the main circuit breaker when delivered to the power grid. Alternatively, during times of energy need the power generated by the alternative energy source is delivered to the sub breakers and bus bars of the main circuit breaker and transferred to the home, building or structure.

The invention described herein is a back feed system and a method of back feeding power to the utility power grid that includes, a main service panel wherein the main service panel includes a main circuit breaker, a back feed circuit breaker and one or more bus bars wherein, the back feed circuit breaker is in parallel tap with the main circuit breaker and wherein said parallel tap is disposed between the main circuit breaker and the one or more bus bars. In such a configuration, the parallel tap is controlled by the main circuit breaker. The back feed circuit breaker is connected to an alternative energy source, wherein the alternative energy source generates electricity referred to herein as backfed power. The alternative energy source delivers the backfed power to the back feed circuit breaker wherein, the backfed power is then delivered by the back feed circuit breaker by parallel tap to the main circuit breaker. The backfed power is delivered to a utility power grid wherein, the backfed power bypasses the one or more bus bars and the bus bars do not form any portion of the circuit with said backfed power. Alternatively, during times of energy need, the backfed power is delivered to the one or more bus bars wherein the backfed power is thereafter delivered to a structure in order to power electrical components installed within the structure.

The back feed system also includes an alternative embodiment wherein the back feed circuit breaker is in parallel tap with the main circuit breaker wherein the parallel tap is disposed between a utility meter and the main circuit breaker. As part of the embodiment the parallel tap is not controlled by the main circuit breaker. In this embodiment backfed power is delivered to a utility power grid wherein the backfed power bypasses the one or more bus bars and the bus bars do not form any portion of the circuit with the backfed power. One or more back feed circuit breakers are envisioned within the scope of the invention to accommodate numerous alternative energy sources and equipment.

The invention further provides a method of installing a back feed circuit breaker into an existing main circuit panel. In particular, the back feed circuit breaker can be procured and installed as a separated "stand alone" circuit breaker that can be installed directly into a main panel that is currently in a home or other structure. Installation of the back feed circuit breaker of the invention allows a user to install the back feed circuit breaker into an existing main panel wherein the back feed circuit breaker is configured with permanently attached electrodes that attach to the existing main breaker.

The back feed circuit breaker is installed between the main source of electrical power and the main breaker, with the back feed circuit breaker designed with permanently installed electrodes that attach to the main breaker allowing the back feed circuit breaker to tap the main source of power in parallel. In a related embodiment of the installation methods described herein, the back feed circuit breaker attaches to the main circuit breaker through electrodes attached to the back feed breaker, the electrodes fitting into the main circuit breaker, with the attachment of the electrodes accomplished by employing use of wire fastening devices that connect the back feed circuit breaker electrodes to the main circuit breaker. The wire fastening devices of the invention ensure a secure attachment between the back feed circuit breaker and the main circuit breaker and also establish a circuit for backfed energy to be delivered either to the grid or to the home or building being supplied with electrical power.

The installation methods further allow a user to install the back feed circuit breaker of the invention as an "off the shelf" device (i.e., aside from incorporation with a main circuit panel) wherein the device is obtained by a user, separate from the main circuit panel and installed into the main panel. For example, the user can install the back feed circuit breaker into an existing main circuit panel that is completely filled with circuit breakers wherein there is no accommodating space in the existing panel for more. In such a case, the back feed circuit breaker is installed in parallel tap with the main breaker thereby eliminating the need to reconfigure the existing main panel so that more alternative energy breakers can be installed.

Installation of the back feed circuit breaker is accomplished with installation of the breaker either on the breaker or supply side of the existing main panel. As described, the back feed circuit breaker of the invention is installed into an existing main electrical panel via a parallel tap connection wherein the main power source, entering from the grid, is tapped in parallel with the back feed circuit breaker and the back feed circuit breaker is configured with permanently attached electrodes that fit and attach into the main circuit breaker. The back feed circuit breaker can also be installed into an electrical sub panel that is fed by a main electrical circuit breaker and main panel.

The invention further describes a back feed system that includes a one-phase, two-phase or three-phase electrical system including wiring lugs for each of the phase configurations. Further, the scope of the invention includes a main circuit breaker that is either a single or double pole circuit breaker. Other pole breakers are included as known in the art. As an alternative to the parallel tap, the invention also employs a "T" tap.

The invention further discloses a novel clamping mechanism that employs a securing means that connects the hot lines of the main circuit breaker to the bus bars in order to form a secure and direct connection thus, reducing the risk of corrosion between the bus bars and the hot lines and therefore reducing the overall risk of fire. Also included is a heat sensor located near the bus bar connection to detect the presence of overheating and to act as a fire or smoke detector, the heat sensor tripping the circuit breaker when excess heat or fire is detected.

It is therefore, a primary object of the present invention to provide a back feed circuit breaker and methods of use that effectively manage excess power generated by an alternative energy source so that excess power is backfed directly to the power grid whereupon the excess power by-passes the bus bars of a main panel circuit breaker thereby ensuring compliance with NEC regulations relating to maintaining bus bar amperage with back fed energy. The present invention assures compliance with existing NEC regulations since excess power generated by the alternative energy source never passes through the bus bars of the main circuit breaker on its way to the utility power grid as is typical in the art, but rather is delivered directly to the power grid, by-passing the bus bars altogether. Alternatively, during times of energy need power generated by the alternative energy device is delivered to the bus bars and onward to sub breakers for distribution to the home or building structure.

In a preferred embodiment, the invention includes a main circuit breaker, one or more bus bars and a back feed circuit breaker wherein the back feed circuit breaker is connected to an alternative energy source and manages power generated from such a source. Power generated by the alternative energy source is delivered to the utility power grid by means of a parallel tap with the main circuit breaker wherein the parallel tap is disposed between the main circuit breaker and the bus bars. Accordingly, excess power generated by the alternative energy source by-passes the bus bars of the main circuit breaker and is delivered directly to the utility power grid.

Alternatively, the parallel tap is disposed between the utility power grid and the main circuit breaker. In such a configuration, power generated from the alternative energy source is delivered from the back feed circuit breaker and is transferred directly to the power grid, by-passing the bus bars of the main circuit breaker altogether. In times of need, power from the alternative energy source is transferred to the main circuit breaker, to the bus bars and on to sub breakers for distribution to areas of the home requiring power.

As part of the preferred embodiment, the back feed circuit breaker employs either interchangeable or fixed sub breakers in the main circuit breaker that distribute and manage power generated from the alternative energy source and which also allow for easy upgrading and installation of alternative energy sources as needed. To upgrade and install additional alternative energy sources in a home or building, a user installs interchangeable sub breakers with high amperage sub breakers so that additional alternative energy sources can be readily and easily installed without the need for rewiring or installation of sub panels.

In yet another preferred embodiment of the invention, the invention includes a main circuit breaker and a back feed circuit breaker which is tapped in parallel wherein the parallel tap is disposed between the main circuit breaker and the bus bars of the main circuit breaker so that power generated by the alternative energy source by-passes the bus bars of the main circuit breaker and power delivered directly to the utility power grid. In a related embodiment, power generated by the alternative energy source is connected in parallel with the hot lines of the main circuit breaker wherein the parallel tap is disposed between the power grid/power meter and the main circuit breaker, by-passing the bus bars of the main circuit breaker altogether. In such a configuration, the back feed circuit breaker is connected to an alternative energy source with power generated by the alternative delivered to either the utility power grid, in times when power is in excess supply, or alternatively, to the home or building, in times when the building or home structure is in need of power from the alternative energy source.

In a preferred embodiment, the present invention includes a main circuit breaker and one or more bus bars connected to the main circuit breaker and also includes an alternative energy source that delivers excess electricity to the power grid or alternatively, to a home or building during times of need through a back feed circuit breaker that is connected in parallel with the hot lines of the main circuit breaker. The main circuit breaker is employed with either a single or double pole circuit breaker.

As part of the preferred embodiment of the invention, the main service panel will employ a 1, 2 or 3-phase circuit breaker. It will be understood by those in the art that 3-phase circuit breakers provide greater efficiency due to the delta of 120 degrees out of phase. Accordingly, a 3-phase circuit breaker is envisioned and within the scope of the present invention.

The invention further provides a method of installing a back feed circuit breaker into an existing main service panel wherein the installation comprises the steps of first connecting the back feed circuit breaker into the existing main service panel to form a circuit. The main panel comprises a main circuit breaker and one or more bus bars wherein; the back feed circuit breaker is connected in parallel tap with the main circuit breaker. The back feed circuit breaker is installed between a utility power grid and the main circuit breaker to form a circuit. The back feed circuit breaker is also connected to an alternative energy source, wherein the alternative energy source generates electricity, the electricity being referred to as backfed power, wherein the alternative energy source delivers the backfed power to the back feed circuit breaker. Thereafter, the backfed power is delivered via the back feed circuit breaker to the utility power grid. In this instance, the backfed power bypasses the one or more bus bars and the bus bars do not form any portion of a circuit formed by the back feed circuit breaker and the main circuit breaker. Alternatively, during times of energy need, the backfed power is delivered to the main circuit breaker and the one or more bus bars. The backfed power is thereafter delivered to a structure in order to power electrical components installed within the structure. The installation also includes the steps of connecting electrodes configured on said back feed circuit breaker and attaching the electrodes to the main circuit breaker and securing the electrodes with wire fastening devices so electrodes are securely fastened to form the circuit with the main circuit breaker.

The method further includes a back feed circuit breaker that is connected in parallel tap with the main circuit breaker wherein the parallel tap is disposed between a utility meter and the main circuit breaker. The method further includes a back feed circuit breaker that is connected in parallel tap with the main circuit breaker wherein, the parallel tap is disposed between the main circuit breaker and the one or more bus bars wherein the backfed power is delivered to the utility power grid. In this instance the backfed power bypasses the one or more bus bars and the bus bars do not form any portion of the circuit with the backfed power. Alternatively, during times of energy need, the backfed power is delivered to the one or more bus bars wherein the backfed power is thereafter delivered to a structure in order to power electrical components installed within the structure.

The method further includes installation of a back feed system including a one-phase, two-phase or three-phase electrical system and also including wiring lugs for each of the phases. Alternative energy sources of the invention include for example, but are not limited to solar panels, wind turbines, hydroelectric generating equipment and gas-powered generators.

The methods of the invention also include installation of a prefabricated main circuit panel into a structure requiring electricity wherein the prefabricated main circuit panel includes a back feed circuit breaker, a main circuit breaker, one or more bus bars and a utility power grid that provides electrical power to a home or other structure requiring electrical power. Installation of the prefabricated main circuit panel includes the steps of first connecting the back feed circuit breaker into the main circuit breaker to form a circuit wherein, the back feed circuit breaker is connected in parallel tap with the main circuit breaker. The back feed circuit breaker is installed in a preferred embodiment between the utility power grid and the main circuit breaker to form a circuit wherein, the back feed circuit breaker is also connected to an alternative energy source. The alternative energy source generates electricity, the electricity being referred to as backfed power. The alternative energy source delivers the backfed power to the back feed circuit breaker wherein, the backfed power is then delivered by the back feed circuit breaker to the utility power grid. In doing so, the backfed power bypasses the one or more bus bars and the bus bars do not form any portion of a circuit formed by the back feed circuit breaker and the main circuit breaker. Alternatively, during times of energy need, the backfed power is delivered to the main circuit breaker and the one or more bus bars wherein the backfed power is thereafter delivered to a structure in order to power electrical components installed within the structure. Installation further includes the steps of connecting electrodes configured on the back feed circuit breaker and attaching the electrodes to the main circuit breaker and securing the electrodes with wire fastening devices so electrodes are securely fastened to form the circuit with the main circuit breaker.

As used herein, the term "connected" refers to the general and known understanding of the term as it relates to the electrical field. For example, understanding of the term includes an electrical connection between two electrical components wherein either an electrical circuit is created when power is present or alternatively, a circuit is interrupted under certain circumstances wherein the electrical components no longer connected to form a circuit to carry power.

As used herein the terms "disposed between", "disposed" refer to the position of a first electrical component, wherein the first electrical component is connected to one or more other electrical components wherein the first electrical component is electrically connected and configured between the other electrical components wherein an electrical circuit can be created. The term also includes the position by which a parallel tap connection is located. In particular, a parallel tap connection can be located and configured to be disposed between the main circuit breaker of the invention and the bus bars. For example, a parallel tap connection can be disposed between the power grid and the main circuit breaker of the invention thus, bypassing the bus bars of the main circuit breaker or alternatively, the parallel tap can be disposed between the main circuit breaker and the bus bars of the main circuit breaker so that in either case, power delivered from the alternative energy source to the grid by-passes the bus bars of the main circuit breaker.

The term "back feed circuit breaker" refers to an element of the invention that includes a circuit breaker that manages the power generated from an alternative energy source such as for example, wind turbines, solar panels and other sources of the like wherein the power generated by the source delivers the power either to the utility power grid or alternatively, to a home or building by parallel tap connection to the hot lines of the main circuit breaker. Likewise, the term "back feed power", "backfed power" or the like as used herein relates to power that is generated from an alternative energy source and is thereafter delivered either to the power grid or alternatively, to a home or building via a main panel circuit breaker by means of a parallel tap connection.

The term "delivered" as used herein refers to the transfer of electricity to electrical components of the invention or delivery of electrical power to main circuit or sub breakers installed in a service panel or building by means of an electrical connection. For example, delivery of electricity as used herein refers to the transfer of electricity from for example, an alternative energy source to a back feed circuit breaker by means of an electrical connection. The term is also referred to herein and understood in its typical sense as that understanding relates to delivery of electricity.

The term "structure" as used herein refers to any home, building or other structure that employs use of electricity and electrical components including but not limited to circuit breakers, power outlets, sub-breakers and which employs use of electricity in order to power electrical components therein. Examples of structures include but are not limited to homes, commercial buildings and other man made structures of the like and kind. The term is also referred to herein and understood in its typical sense.

The terms "utility", "utility power grid", "power grid" and terms of the like as used herein, are to be understood in their typical sense and more specifically, refer to a utility company that generates and provides electricity to the general public.

Turning now to the substance of FIGS. 1 to 21 and the preferred embodiments of the invention. FIG. 1 illustrates the known art wherein a main service panel is employed to service the electrical needs of a home or building. To install alternative energy sources and equipment such as for example, solar panels, wind turbines, electrical generators and the like, a sub panel must also be installed or the main service panel must be replaced altogether. The sub panel manages the electricity generated by the solar panel or alternative energy device and must be installed adjacent to the main service panel requiring installation by a licensed and trained electrician.

Figure 2:
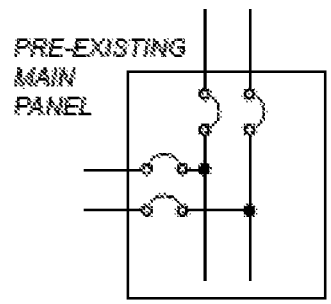
FIG. 2 depicts a basic configuration of the pre-existing art as it relates to a main service panel wherein a two-pole configuration is shown.

FIG. 2 illustrates a schematic of a pre-existing main service panel. Specifically, as shown, power enters the main panel at the top of the panel in two phases of 120 volts of alternating current. As shown, a main circuit breaker manages the power coming from the utility and transfers the power to sub breakers in the main panel.

Figure 3:
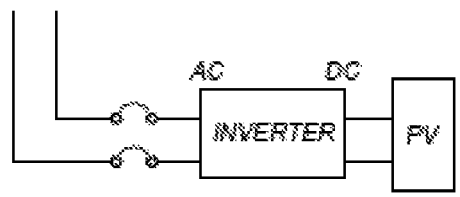
FIG. 3 depicts a basic schematic of an alternative energy source wherein power generated from a photovoltaic source and is transferred to an inverter and thereafter on to a main panel for transfer to the power grid or alternatively, to the home or building structure.

FIG. 3 illustrates a typical electrical schematic of a circuit associated with a photovoltaic electrical generator. As shown, solar panels generate electricity as direct current (DC) wherein the power is converted to alternating current (AC) by an inverter and transferred to the main service panel and bus bars for transfer to the power grid.

Figure 4:
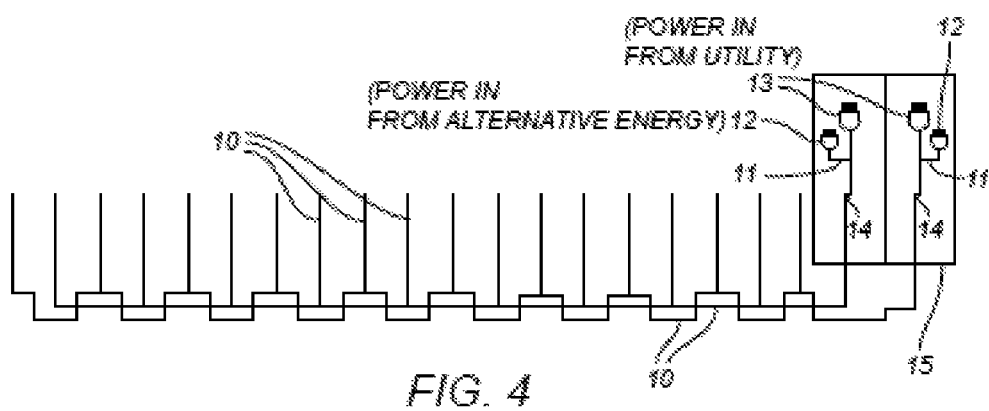
FIG. 4 illustrates an overview of a back feed circuit breaker and parallel tap wherein the parallel tap from the back feed circuit breaker is disposed between the main panel circuit breaker and the bus bars of the main panel.

FIG. 4 illustrates a preferred embodiment of the invention. Specifically, the figure illustrates an electrical schematic of the invention and includes a main circuit breaker 13, a back feed circuit breaker 12 that manages the power generated from an alternative energy source and bus bars connected to the main circuit breaker 10. The figure depicts the main service panel 15 of the invention wherein power enters from the utility at the main circuit breaker 13 in two, 120 V, A and B phases. Power from the utility is transferred from the main circuit breaker 13 to the bus bars 10. Further, one or more alternative energy circuit breakers are tapped in parallel 12 wherein the parallel tap 11 is disposed between the main circuit breaker and the bus bars. The parallel tap connecting one or more alternative energy circuit breakers is disposed between the main circuit breaker and the point of connection to the bus bars 14 and the bus bars 10 so that power transferred from the alternative energy source bypasses the bus bars of the main circuit breaker and is delivered directly to the power grid. In such a configuration, power generated by the one or more alternative energy circuit breakers is transferred to the main circuit breaker and by-passes the bus bars, going directly to the power grid without passing through the bus bars.

Reference 11 illustrates the point at which the bus bars of the main circuit breaker are by-passed and power sent directly to the power grid. Accordingly, power generated by the alternative energy source by passes the bus bars except during times of energy need when the structure requires power generated by the alternative energy source. Power is generated by the alternative energy source, transferred to the alternative energy circuit breaker and thereafter, directly to the main circuit breaker for delivery to the power grid, with power from the alternative energy source by-passing the bus bars of the main circuit breaker altogether, thereby maintaining compliance with NEC codes and amperage rating of the bus bars.

Figure 5:
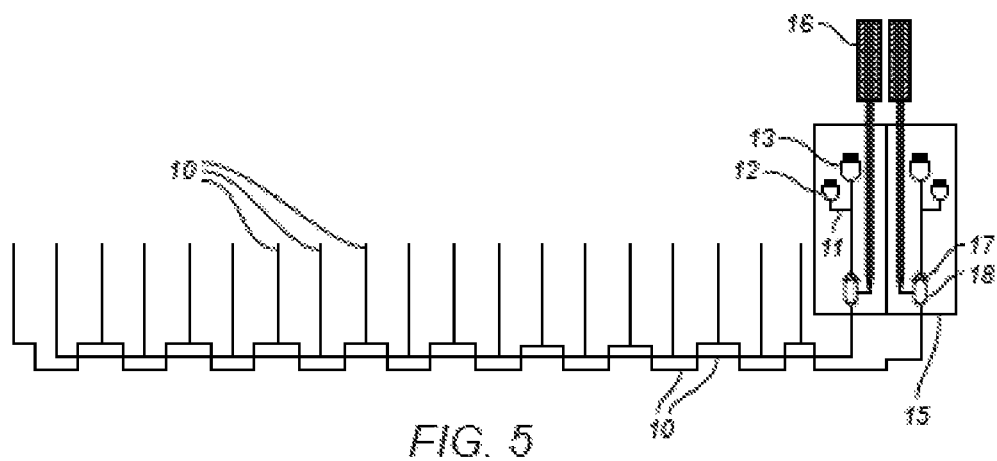
FIG. 5 illustrates a bus bar clamping mechanism of the invention. In particular, a specially designed screwdriver is employed to connect the hot wires directly and securely to the bus bars. The system is isolated so electric shock is eliminated when tightening and clamping bus bars.

FIG. 5 illustrates a preferred embodiment of the invention wherein the bus bars 10 of the main circuit breaker are directly and securely connected 17 to the load lines of the main circuit breaker. As shown, the bus bars are connected to the main circuit breaker by means of a tool or mechanism of the invention 16 that directly and securely attaches the bus bars to the lines of the main circuit breaker so that there is a constant connection 17, 18. Typical bus bars typically possess a passive connection wherein a spring/bus connection is formed however, generally there is no direct and secure connection between the two elements resulting in movement between the elements, resulting in carbon build up and increased risk of fire. The novel and specially designed clamping mechanism allows a direct, secure connection between the lines of the main circuit breaker and the bus bars so that carbon build up is minimized and risk of fire is greatly diminished.

Figure 6:
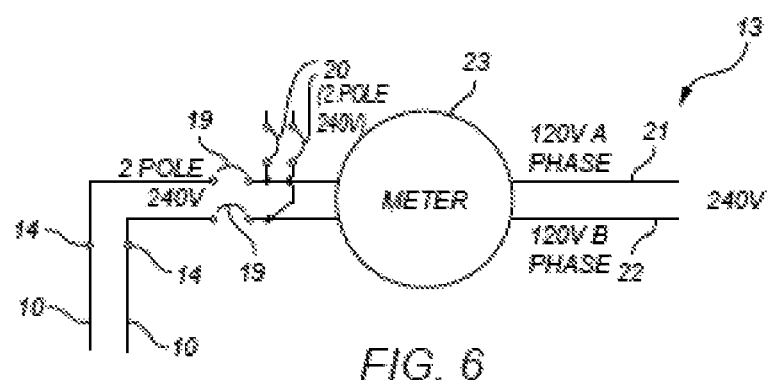
FIG. 6 illustrates the back feed circuit breaker and parallel tap wherein the parallel tap is disposed between the utility meter and the main circuit breaker to the panel (supply side). As shown, the main circuit breaker and the back feed circuit breaker are depicted as 2-pole 240-volt breakers. The figure illustrates a configuration in which the main circuit breaker is not controlling the parallel tap.

FIG. 6 illustrates an alternative embodiment of the invention. Specifically, the illustration provides incoming power from the utility 13 in two, 120-volt phases, A and B, 21, 22, with a total of 240 volts entering from the utility. The power from the power grid enters the home or building via a power meter 23. An alternative energy circuit breaker 20 comprising a 2-pole 240-volt breaker is tapped in parallel with the main circuit breaker 19 wherein the parallel tap is disposed between the power meter and the main two-pole, 240-volt circuit breaker 19 (i.e., main circuit breaker). As shown, the alternative energy circuit breaker is in parallel tap with the main circuit breaker wherein the parallel tap is disposed between the power grid and the bus bars 10 and the point of bus bar connection 14 (supply side parallel tap). In this configuration, the main circuit breaker does not control the parallel tap.

The alternative energy circuit breaker is connected to and manages power generated from an alternative energy source such as for example, a solar panel assembly, wind turbines or other alternative energy equipment as known in the art. As excess power is generated by the alternative energy source and delivered to the alternative energy circuit breaker, the power is sent either to the power grid, when power is not needed in the home or structure, or alternatively, to the bus bars 10 for delivery to sub breakers that distribute power to various areas of the home, building or structure. As shown in FIG. 6, in this alternative embodiment, the alternative energy circuit breaker 20 is disposed prior to both the main circuit breaker 19 and the bus bars 10. Accordingly, power generated by the alternative energy source, when being directed to the power grid, bypasses the bus bars of the main circuit panel entirely. In times when the home, building or structure require power, electricity generated by the alternative energy source is directed through the bus bars and sent on to the sub breakers of the home, building or structure.

Figure 7:
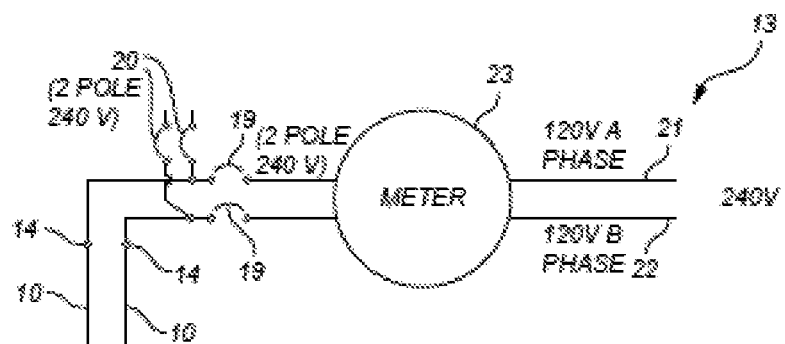
FIG. 7 illustrates an alternative design of the back feed circuit breaker wherein the back feed circuit breaker and parallel tap is disposed between the main circuit breaker and the bus bars (breaker side). As shown, the main breaker and back feed circuit breaker are depicted as 2-pole 240-volt breakers. The figure illustrates a configuration in which the main breaker controls the parallel tap.

FIG. 7 illustrates a preferred alternative embodiment of the invention. Specifically, the illustration provides incoming power from the utility 13 in two, 120-volt phases, A and B, 21, 22, with a total of 240 volts entering from the utility. The power from the power grid enters home or building via a power meter 23. An alternative energy circuit breaker 20 comprising a 2-pole 240-volt breaker is tapped in parallel with the main circuit breaker with the parallel tap disposed between the main two-pole, 240-volt circuit breaker 19 (i.e., main circuit breaker) and the bus bars 10 and bus bar connection points 14. The alternative energy circuit breaker is connected to and manages power generated from an alternative energy source such as for example, a solar panel assembly, wind turbines or other alternative energy equipment as known in the art. Accordingly, power generated by the alternative energy source, when being directed to the power grid, bypasses the bus bars of the main circuit panel entirely. In times when the home, building or structure require power, electricity generated by the alternative energy source is directed through the bus bars and sent on to the sub breakers of the home, building or structure.

Figures 8A, 8B:
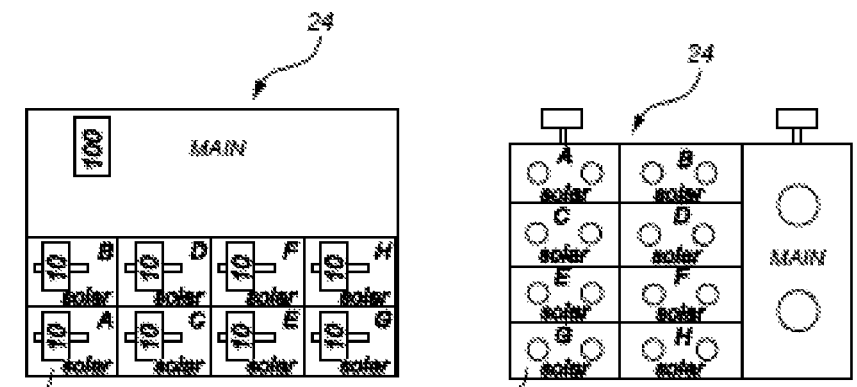
FIG. 8a illustrates the invention wherein the main circuit breaker is configured in a main panel wherein sub breakers of the main panel are interchangeable. The main and sub breakers are depicted as 2-pole, 240-volt breakers.
FIG. 8b illustrates the invention wherein the main circuit breaker is shown in a side view and configured in a main panel wherein the sub breakers of the main panel are interchangeable. Connection terminals are illustrated.

FIG. 8A illustrates the invention that includes a main circuit breaker 24 rated at for example, 100 amps and also sub breakers 26 of the invention. As shown, the main circuit breaker is configured with several sub breakers 26 that are interchangeable. Accordingly, sub breakers of the invention can be replaced and interchanged with other sub breakers rated at either higher or lower amperage. For example, in the event a home owner wishes to upgrade the alternative energy capability of the owner's home the owner may replace a lower amperage sub breaker with a higher rated sub breaker in order to accommodate the additional load on the main panel. FIG. 8B is a side perspective of the main circuit breaker 24 and several sub breakers 26 of the invention. The illustration shows the manner in which the main circuit breaker is configured with interchangeable sub breakers and also shows the terminal connections of the main and sub breakers.

Figures 9A, 9B:
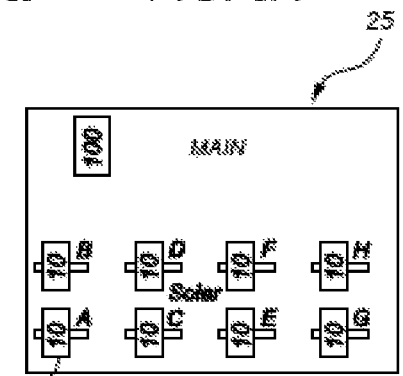
FIG. 9a illustrates the invention wherein the main circuit breaker is configured in a main panel wherein sub breakers of the main panel are fixed. As shown, the sub-breakers comprise sub breakers that manage power generated from an alternative energy source. The main and sub breakers are depicted as 2-pole, 240-volt breakers
FIG. 9b illustrates the invention wherein the main circuit breaker is shown in a side view and configured in a main panel wherein the sub breakers of the main panel are fixed. The main and sub breakers are depicted as 2-pole, 240-volt breakers. Connection terminals are illustrated.

FIG. 9A illustrates the invention that includes a main circuit breaker 25 rated at for example, 100 amps and also sub breakers 27 of the invention. As shown, the main circuit breaker is configured with several sub breakers 27 that are fixed. Accordingly, a homeowner can select the fixed sub breakers if no upgrades of alternative energy sources are anticipated in the future. FIG. 8B is a side perspective of the main circuit breaker 24 and several sub breakers 26 of the invention. The illustration shows the manner in which the main circuit breaker is configured with fixed sub breakers and also shows the terminal connection points.

FIG. 10 illustrates several embodiments of the interchangeable main circuit breaker system 24. The main circuit breaker includes a main circuit breaker 29 and one or more sub breakers 26 that can be replaced or removed. As shown, the main circuit breaker system can be configured with one or several sub breakers to accommodate increasing alternative energy sources that are installed in a home, building or structure. Also provided is a side view perspective of the main circuit breaker system 24 that incorporates interchangeable sub breakers. In particular, the perspective depicts the main circuit breaker, numerous sub breakers and the terminal connection points of the main circuit breaker system.

Figure 11:
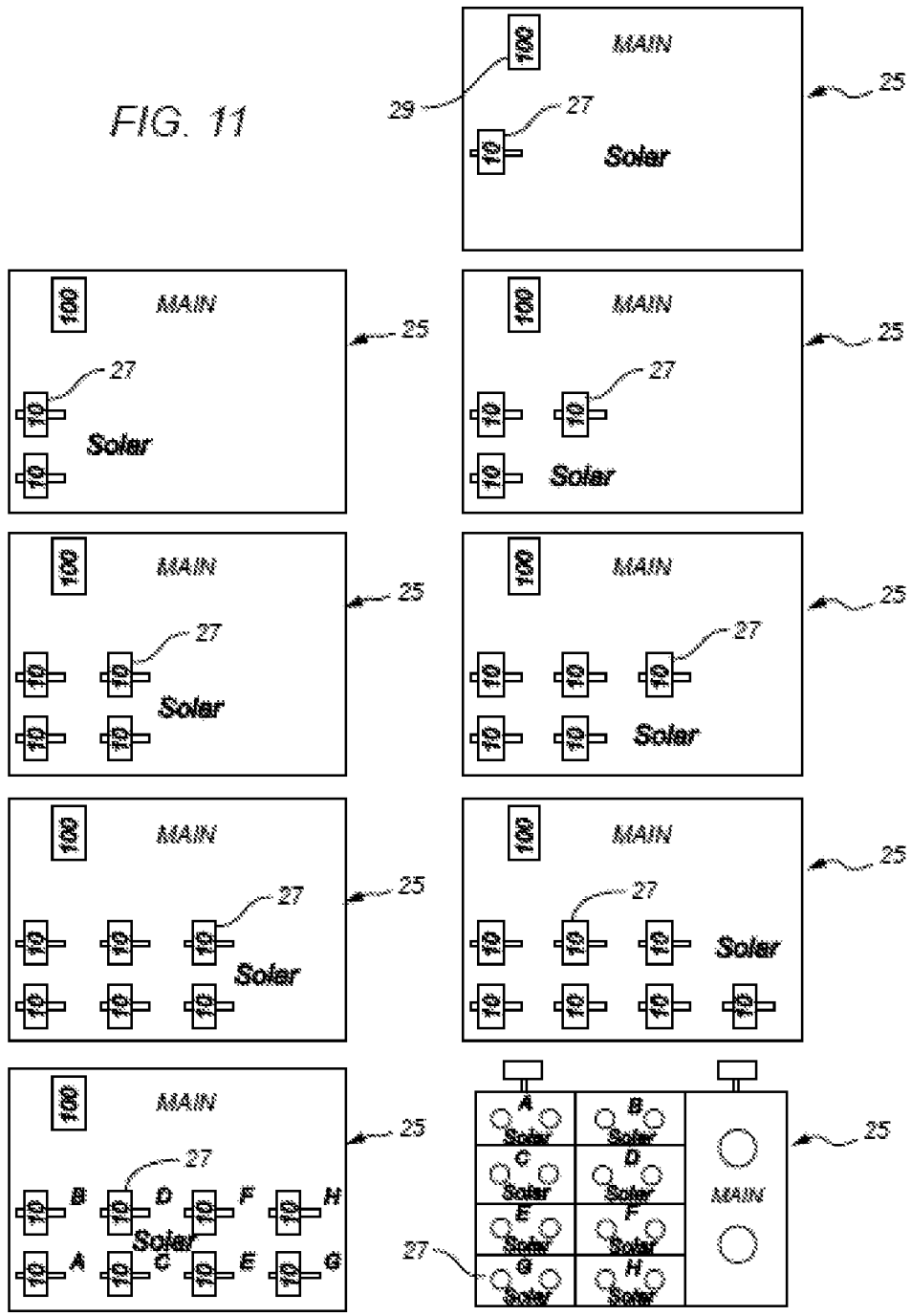
FIG. 11 illustrates the main circuit breaker and one or more fixed sub breakers connected to the main circuit breaker. As illustrated, one or more fixed sub breakers are connected to a main circuit breaker in order to accommodate upgraded alternative energy sources installed into the home or structure. Also provided is a side view of the main circuit breaker and one or more fixed back feed circuit breakers with terminal connections provided. The main and sub breakers are depicted as 2-pole, 240-volt breakers.

FIG. 11 illustrates several embodiments of the fixed main circuit breaker system 25. The main circuit breaker includes a main circuit breaker 29 and one or more sub breakers 27 that are fixed in place and cannot be replaced or removed. As shown, the main circuit breaker system can be configured with one or several sub breakers to accommodate increasing alternative energy sources that are installed in a home, building or structure. Also provided is a side view perspective of the main circuit breaker system 24 that incorporates fixed sub breakers. In particular, the perspective depicts the main circuit breaker, numerous sub breakers and the terminal connection points of the main circuit breaker system.

Figure 12:
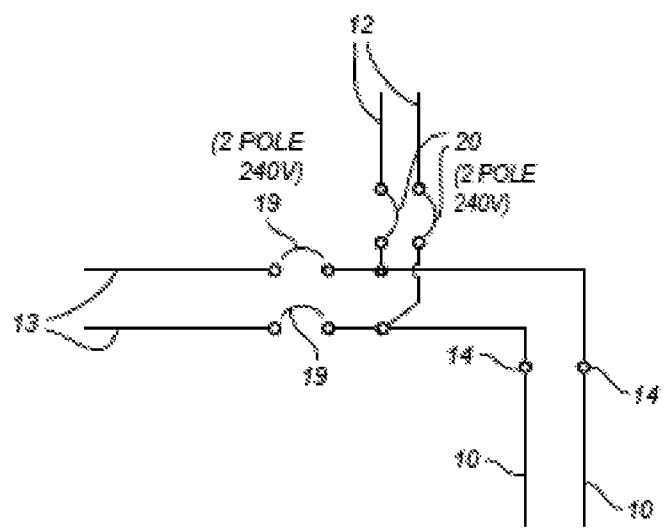
FIG. 12 illustrates a general depiction of the invention. In particular, the schematic illustrates power in from the utility wherein the power is delivered to the main circuit breaker of the main panel via 2-pole 240-volt breaker. Further provided is the back feed circuit breaker that is tapped in parallel with the hot lines of the main circuit breaker. As depicted, the parallel tap is controlled by the main circuit breaker wherein the parallel tap is disposed between the main circuit breaker and the bus bars. The parallel tap delivers excess power (i.e., backfed power) to the utility or alternatively, during times of need, the power is transferred to the main circuit breaker, then on to the bus bars and transferred to sub breakers which distribute the power to the structure.

FIG. 12 illustrates a general schematic of the preferred embodiment of the invention. Specifically, power in from the utility 13 enters in two phases of 120 volts each and is delivered to the main circuit breaker 19 (two-pole, 240 volt circuit breaker). Power generated (i.e., backfed power) by an alternative energy source 12 is transferred to a two-pole, 240-volt back feed circuit breaker, that circuit breaker comprising the back feed circuit breaker 20 of the invention. The back feed circuit breaker is connected in parallel tap with the main circuit breaker, wherein the parallel tap is disposed between the main circuit breaker and the bus bars 10 of the main circuit breaker, prior to the point where the bus bars are connected to the main circuit breaker 14. Accordingly, excess power generated by the alternative energy source bypasses the bus bars of the main circuit breaker, thereby maintaining compliance with NEC regulations.

Figure 13:
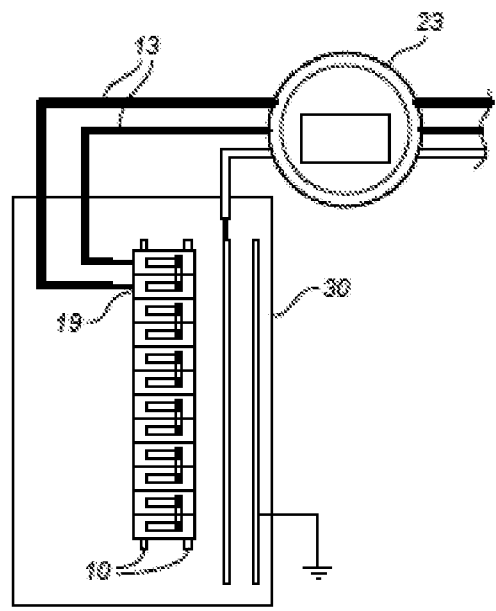
FIG. 13 depicts a main circuit breaker and main electrical panel as typically known in the art. As shown, a main source of electricity enters from a meter to a 2-pole, 240-volt breaker. Circuit breakers and bus bars are further illustrated.

FIG. 13 illustrates a main electrical panel 30 and main circuit breaker as typically known in the art. Power enters from the grid and meter 23 via two-phase electric power 13, the electricity entering the main circuit breaker through connections at the main breaker 19, as shown a 2-pole, 240-volt breaker. Bus bars 10 are illustrated at the bottom of the main panel circuit breakers. Power generated by an alternative energy source is typically connected to the main electrical panel after the bus bars of the main circuit breaker. Accordingly, power generated from alternative energy sources must pass through the bus bars and the main circuit breaker prior to delivery to the power grid.

Figure 14:
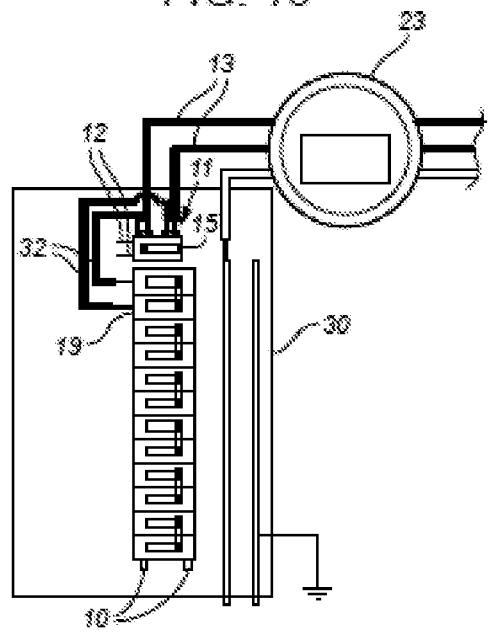
FIG. 14 depicts a preferred embodiment of the invention wherein the back feed circuit breaker is shown installed in a typical, pre-existing main panel and circuit panel. In particular, the back feed circuit breaker is installed in parallel tap with the main source of electricity entering from the grid and meter. The back feed circuit breaker includes permanently attached electrodes that attach to the main circuit breaker. The back feed circuit breaker is also connected to an alternative energy source such as photovoltaic cells, wind turbines or other alternative energy sources as are known in the art. When generated, electricity from the alternative energy source is delivered to the back feed circuit breaker where it is either returned to the grid or during times of need, delivered to the home or building structure.

FIG. 14 illustrates installation of the back feed circuit breaker of the invention as it is employed and installed into an existing main electrical panel 30 and main circuit breaker 19. As illustrated, electricity enters from the grid and an electrical meter 23 in two-phase electrical power 13. The power enters the back feed circuit breaker 15, which is connected 32 via parallel tap with the main circuit breaker 19. The point at which the main power supply connects to the back feed circuit breaker is the connection point 11 at which power generated by the alternative energy source bypasses the main circuit breaker and the bus bars 10 of the main circuit breaker. Electrodes on the back feed circuit breaker 12 connect the breaker to an alternative energy source (not shown). When power is generated by the alternative energy source and delivered to the back feed breaker 15, 12, the power is referred to as backfed power which is either delivered to the grid, bypassing the bus bars 10 of the main circuit breaker 19, or is delivered to the main circuit breaker and in turn to the bus bars for distribution to the home or building being powered. As depicted in the illustration, the back feed circuit breaker is installed adjacent to the main circuit breaker with connections 32 made to the main circuit breaker to establish a circuit with the main panel.

Figure 15:
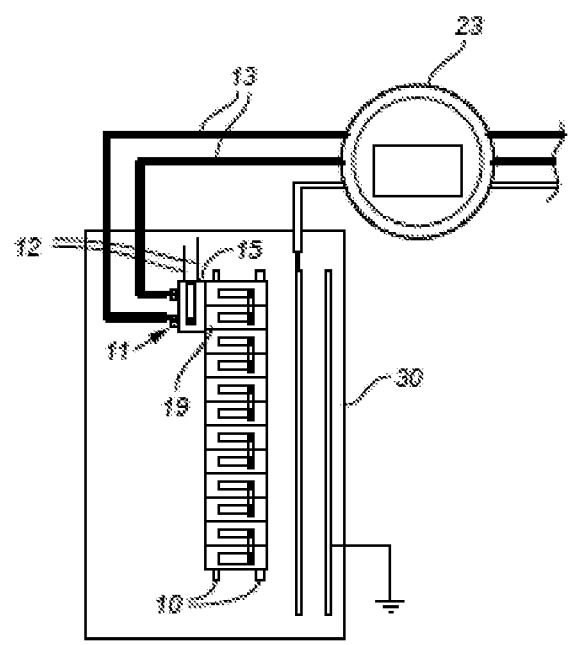
FIG. 15 illustrates a related embodiment of the invention wherein the back feed circuit breaker of the invention is installed and connected directly to an existing main circuit breaker. Power entering from the grid is delivered to the main circuit breaker and distributed, via the bus bars, to the rest of the home or building. The back feed circuit breaker delivers power generated from an alternative energy source to the grid or to the home or structure and bypasses the bus bars altogether, being delivered directly to the grid.

FIG. 15 illustrates an alternative preferred embodiment that depicts installation of the back feed circuit breaker into an existing main electrical panel 30 and main circuit breaker 19. As illustrated, electricity enters from the grid and an electrical power meter 23 in two-phase electrical power 13. The power enters the back feed circuit breaker 15, which is connected, via parallel tap with the main circuit breaker 19. The point at which the main power supply connects to the back feed circuit breaker is the connection point 11 at which power generated by an installed alternative energy source bypasses the bus bars 10 of the main circuit breaker. Electrodes on the back feed circuit breaker 12 connect the breaker to an alternative energy source (not shown). When power is generated by the alternative energy source and delivered to the back feed breaker 15, 12, the power is referred to as backfed power which is either delivered to the grid, by-passing the bus bars 10 of the main circuit breaker 19, or is delivered to the main circuit breaker and in turn to the bus bars for distribution to the home or building being powered. As depicted, the back feed circuit breaker of the invention is installed directly into the main circuit breaker.

Figure 16A:
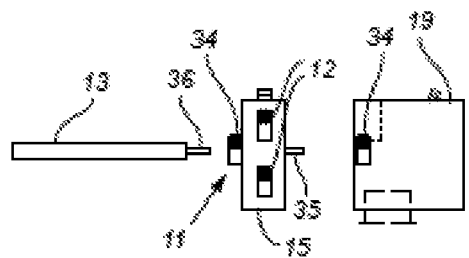
FIGS. 16A and 16B illustrate the basic installation of the back feed circuit breaker into an existing main circuit breaker.
Figure 16B:
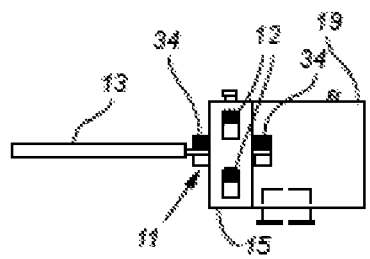

FIGS. 16A and 16B illustrate actual installation of the back feed circuit breaker 15 of the invention into an existing main circuit breaker 19. FIGS. 16A and 16B illustrate the unconnected (16A) and connected, installed (16B) elements of the invention. As illustrated in 16A, a main power line connection 13 entering from the power grid is designed to fit into the back feed circuit breaker 15 via a wire 36 that fits into the feed back circuit breaker and a wire fastening device 34 configured into one side of the back feed circuit breaker. In turn, the back feed circuit breaker is configured with a permanently attached electrode 35 that is designed to fit into connection points of a main circuit breaker 19, the connection points of which also provide a wire fastening device 34 to securely connect the back feed circuit breaker to the main circuit breaker and establish a circuit. Reference number 12 illustrates connection points for the alternative energy source. Wire fastening devices 34 also securely connect the electrical connections between the alternative energy device and the back feed circuit breaker. FIG. 16B illustrates direct connection and installation between the elements of the invention including the back feed circuit breaker 15, the main power source lines 13 as well as the main circuit breaker 19. As shown in FIG. 16B, the circuit is closed and power can be delivered from either the main power grid or from the alternative power source. The elements of FIGS. 16A and 16B are depicted from a side view perspective.

Figure 17A:
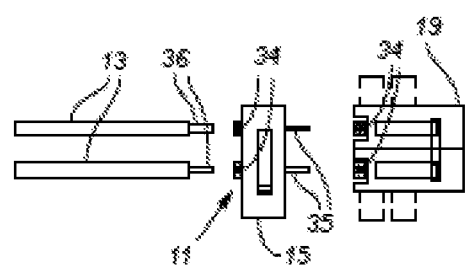
FIGS. 17A and 17B illustrate the basic installation of the back feed circuit breaker into an existing main circuit breaker.
Figure 17B:
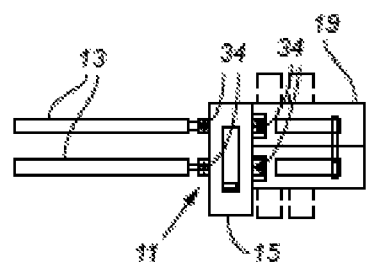

FIGS. 17A and 17B illustrate the unconnected (17A) and connected, installed (17B) elements of the invention. As shown, electricity enters from the grid via two-phase electrical power lines 13 with the incoming power connected to the back feed circuit breaker 15 by a connection wire 36 that fits into a wire fastening device 34 configured on the back feed circuit breaker. The illustrations depict the elements of the invention from a top view perspective. The back feed circuit breaker connects to the main circuit breaker through two permanently attached electrodes 35 configured on the back feed circuit breaker, the electrodes of which fit into the main circuit breaker and are secured to the main circuit breaker with wire fastening devices 34 configured on the main circuit breaker 19. Reference 11 depicts the point at which power generated by an alternative energy source connected to the back feed circuit breaker bypasses the bus bars (not shown) of the main circuit breaker. FIG. 17B depicts elements of the invention in a connected and installed configuration wherein the two phase electrical power lines are installed and connected to the back feed circuit breaker and the back feed circuit breaker in turn, is installed into the main circuit breaker 19 of the main electrical panel.

Figure 18:
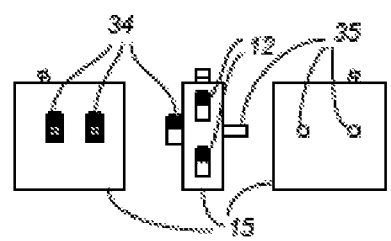
FIG. 18 illustrates the physical attributes of the back feed circuit breaker and its connections related to the main power lines, the back feed circuit breaker and the main circuit breaker of an existing main panel. The connections depict a two-phase power source.

FIG. 18 illustrates connection points relating to the back feed circuit breaker of the invention. As shown, on a side, left view perspective of the illustration, the back feed circuit breaker 15 is configured with incoming connection points 34 that are designed to include wire fastening devices on each connection site to securely attach electrical lines coming from the power grid. It is noted that the back feed circuit breaker is designed to accommodate single, two or three phase electrical power sources and lines. Depicted on the opposite, right side of the illustration are permanently attached electrodes 35 that connect, and establish a circuit, with the main circuit breaker of the existing main panel. Reference 12 refers to connection points at which an alternative energy source is connected to the back feed circuit breaker.

FIGS. 19A and 19B illustrate an alternative preferred embodiment of several elements of the invention. FIG. 19A (unconnected) and FIG. 19B (connected and installed elements) illustrate the order in which several elements of the invention are installed into a main circuit breaker. The Figures illustrate a side view perspective of the invention elements. As shown, electrical power enters from the power grid by electrical lines 13 and an electrical wire 36 that extends to fit into the back feed circuit breaker 15 within wire fastening devices 34 configured into the back feed circuit breaker. In turn, the back feed circuit breaker is connected to a main circuit breaker 19 by electrical connections configured on the back feed circuit breaker to form a circuit with the main circuit breaker. Electrical connections to the main circuit breaker are also established through the use of wire fastening devices 34 configured on the main circuit breaker. FIG. 19A depicts the elements of the invention prior to connection and installation, FIG. 19B depicts the elements as they are installed and connected together to form a circuit.

FIGS. 20A and 20B illustrate a top view perspective of the elements described above in FIGS. 19A and 19B. FIG. 20A depicts electrical power entering in the form of two-phase electrical lines 13 prior to attachment to the back feed circuit breaker 15. Wire extensions 36 from the main power lines 13 are illustrated prior to installation and connection into the back feed circuit breaker. The back feed circuit breaker is depicted adjacent to the main circuit breaker 19. FIG. 20B depicts the elements of the invention in an installed and connected configuration wherein the elements form a circuit. The extension wires 36 and electrical connections of the back feed circuit breaker are installed and connected together and secured by means of wire fastening means 34 in the main circuit breaker and the back feed circuit breaker.

FIG. 21 illustrates the alternative preferred embodiment of the back feed circuit breaker of the invention 15. On the left most side of the illustration is shown the wire attachment points for the two-phase electrical connections coming from the power grid. It is noted that the back feed circuit breaker is designed to accommodate single, two or three phase power lines. Reference 34 illustrates the wire fastening devices that securely attach power incoming from the grid that is delivered to the back feed circuit breaker. Illustrated on the back feed circuit breaker are connection and attachment points for an alternative energy device 12. At this point, an alternative energy device such as for example, a solar panel, wind turbine or the like, is attached to the back feed circuit breaker for delivery of generated power to either the power grid or to the main circuit breaker and for distribution to the home or building being powered. The right most side perspective the illustration depicts the attachment points between the back feed circuit breaker and the main circuit breaker.

To manufacture the circuit breaker invention, materials and methods known in the art are employed and are envisioned within the scope of the present invention. Certain advantages can be obtained in utilizing the present invention. Foremost, the invention allows a user to save significant time and expense associated with installation of alternative energy devices including but not limited to solar panels, wind turbines and other electricity generating technologies. The invention does so by enabling a home or building owner to install the invention during construction of the structure, even during instances in which alternative energy devices are not installed in the structure, and to install electric generating technologies either during construction of the structure or years after construction has taken place. Accordingly, the present invention is capable of replacing all existing main panels installed in freestanding structures as well as in all future home and building construction.

Benefits of the present invention over the prior art also include back feeding excess energy to the grid for overall use by the public and decrease of electrical rates to the homeowner. Further, the invention encourages the installation of alternative energy technologies including solar panels, wind turbines, as well as any other resource conserving electric generating technology, even those as yet undiscovered in the art.

Although the invention has been described with reference to the above examples, it will be understood that modifications and variations are encompassed within the spirit and scope of the invention. Accordingly, the invention is limited only by the following claims.

What is claimed is:

1. A method of installing a back feed circuit breaker into an existing main service panel that receives electrical power from power lines that provide power from a utility power grid, the back feed circuit breaker comprising a housing having a first surface and a plurality of wire fastening devices, the main service panel including a main circuit breaker electrically connected to one or more bus bars such that an alternative energy source that is connected to the back feed circuit breaker can provide power to the utility power grid via the power lines without the provided power passing through the one or more bus bars, the main circuit breaker comprising a housing having a first surface and a plurality of wire fastening devices, the method comprising:

connecting the back feed circuit breaker into the existing main service panel by securing each of the power lines within one of the plurality of wire fastening devices of the back feed circuit breaker such that the back feed circuit breaker is electrically connected, in the main service panel, to the power lines in a parallel electrical connection with the main circuit breaker, wherein the first surface of the housing of the back feed circuit breaker is located adjacent and parallel to the first surface of the main circuit breaker when the back feed circuit breaker is connected into the existing main service panel, wherein the electrical connection of the back feed breaker to the power lines is in the main service panel and between the main circuit breaker and the utility power grid to form a circuit from the back feed circuit breaker to the utility power grid, the circuit providing an electrical path for power provided from the alternative energy source to flow through the back feed breaker to the utility power grid without passing through the one or more bus bars of the main service panel.

2. The method of installing a back feed circuit breaker into an existing main service panel of claim 1, wherein said main circuit breaker is connected to one or more sub breakers.

3. The method of installing a back feed circuit breaker into an existing main service panel of claim 2, wherein said one or more sub breakers comprise interchangeable breakers.

4. The method of installing a back feed circuit breaker into an existing main service panel of claim 2, wherein said one or more sub breakers comprise fixed breakers.

5. The method of installing a back feed circuit breaker into an existing main service panel of claim 1, wherein the main service panel forms a part of a one-phase, two-phase or three-phase electrical system.

6. The method of installing a back feed circuit breaker into an existing main service panel of claim 1, wherein said main circuit breaker is either a single or double pole circuit breaker.

7. The method of installing a back feed circuit breaker into an existing main service panel of claim 1, wherein said alternative energy source comprises solar panels, wind turbines, hydroelectric generating equipment and gas powered generators.

8. The method of installing a back feed circuit breaker into an existing main service panel of claim 1, wherein the back feed breaker comprises electrodes permanently attached to the back feed circuit breaker, the method further comprising securing the back feed breaker electrodes to the main circuit breaker.

9. The method of installing a back feed circuit breaker into an existing main service panel of claim 8, wherein the permanently attached electrodes are secured to said main circuit breaker by means of wire fastening devices.

10. The method of installing a back feed circuit breaker into an existing main service panel of claim 1, further comprising electrically connecting the back feed breaker to the alternative energy source.

11. The method of claim 1, wherein connecting the back feed circuit breaker into the existing main service panel comprises securing the power lines within the wire fastening devices on the back feed circuit breaker such that the power lines extend through the wire fastening devices within the back feed circuit breaker housing and into the main circuit breaker.

12. The method of claim 1, wherein the back feed circuit breaker includes a second plurality of wire fastening devices configured to receive power from an alternative energy source, and a back feed breaker switch disposed along an electrical circuit between one of the first plurality of wire fastening devices and one of the second plurality of wire fastening devices.

13. A back feed system comprising:
a main service panel, comprising:
a main circuit breaker located within the main circuit panel;
one or more bus bars located within the main service panel, the main circuit breaker connected to the one or more bus bars;
one or more additional circuit breakers connected to the bus bars;
a power line extending into the main circuit breaker, the power line providing power from a utility power grid; and
a back feed circuit breaker located within the main service panel, comprising:
a housing, the housing comprising a first surface dimensioned to be positioned adjacent to one of the main circuit breaker or the one or more additional circuit breakers within the main circuit panel;
a back feed breaker switch located at least partially within the housing;
a first wire fastening device on the back feed circuit breaker, the first wire fastening device configured to receive power from an alternative energy source;
a second wire fastening device on the back feed circuit breaker, the second wire fastening device securely connected to a portion of the power line extending therethrough, the back feed circuit breaker switch disposed along an electrical circuit between the first wire fastening device
and the second wire fastening device;
wherein the back feed circuit breaker is connected via a parallel tap between the power line and the one or more bus bars such that the alternative energy source can provide power through the back feed circuit breaker to the utility power grid without passing through the one or more bus bars.

14. The system of claim 13, wherein the main circuit breaker comprises a housing, the housing having a first surface, and wherein the first surface of the housing of the main circuit breaker is located adjacent the first surface of the housing of the back feed circuit breaker.

15. The system of claim 13, wherein the main circuit breaker comprises a housing, the housing having a first surface, and wherein the first surface of the housing of the main circuit breaker is oriented parallel to the first surface of the housing of the back feed circuit breaker.

16. The system of claim 13, wherein the back feed circuit breaker is not directly electrically connected to the bus bars.

17. A method of installing a back feed circuit breaker into a main service panel, the back feed circuit breaker comprising a first plurality of wire fastening devices and a housing having a first surface, the method including:

positioning the back feed circuit breaker within the main service panel such that the first surface of the housing of the back feed circuit breaker is positioned directly adjacent to a first surface of a housing of a main circuit breaker disposed within the main service panel, the main circuit breaker connected to a plurality of bus bars within the main service panel;

securing each of a plurality of power lines within one of the plurality of wire fastening devices of the back feed circuit breaker, the plurality of power lines configured to provide power from a utility to the main service panel; and electrically connecting the back feed circuit breaker to the main circuit breaker via a parallel tap between the plurality of power lines and the plurality of bus bars, such that power from an alternative energy source can be fed back through the back feed circuit breaker to the utility through the power lines without passing through the plurality of bus bars connected to the main circuit breaker.

18. The method of claim 17, wherein electrically connecting the back feed circuit breaker to the main circuit breaker comprises inserting the plurality of power lines into wire fastening devices in the main circuit breaker.

19. The method of claim 17, wherein electrically connecting the back feed circuit breaker to the main circuit breaker comprises inserting a plurality of electrodes extending from the back feed circuit breaker into wire fastening devices in the main circuit breaker.

* * * * *